US012560489B2

(12) United States Patent
    Kho et al.

(10) Patent No.:   US 12,560,489 B2
(45) Date of Patent:       Feb. 24, 2026

(54) SENSOR ARRANGEMENT AND METHOD FOR PRODUCING A SENSOR ARRANGEMENT

(71) Applicant: TDK Electronics AG, Munich (DE)

(72) Inventors: Abraham Kho, Singapore (SG); Guido Mauthe, Kepulauan Riau (ID); Andi Permana, Kepri (ID)

(73) Assignee: TDK Electronics AG, Munich (DE)

( * ) Notice: Subject to any disclaimer, the term of this patent is extended or adjusted under 35 U.S.C. 154(b) by 400 days.

(21) Appl. No.: 17/759,815

(22) PCT Filed: Dec. 1, 2021

(86) PCT No.: PCT/EP2021/083721
    § 371 (c)(1),
    (2) Date: Jul. 29, 2022

(87) PCT Pub. No.: WO2022/128468
    PCT Pub. Date: Jun. 23, 2022

(65) Prior Publication Data
    US 2023/0104239 A1     Apr. 6, 2023

(30) Foreign Application Priority Data

Dec. 17, 2020   (DE) ..................... 10 2020 133 985.2

(51) Int. Cl.
    *G01K 1/143*          (2021.01)
    *G01K 1/12*           (2006.01)
                (Continued)
(52) U.S. Cl.
    CPC .............. *G01K 1/143* (2013.01); *G01K 1/12* (2013.01); *G01K 1/18* (2013.01); *H01C 7/04* (2013.01)

(58) Field of Classification Search
    CPC ............ G01K 1/143; G01K 1/12; G01K 1/18; G01K 2007/163; H01C 7/04; H01C 1/028; H01C 1/012; H01C 1/144; H01C 7/02
    See application file for complete search history.

(56) References Cited

U.S. PATENT DOCUMENTS 4,924,204 A    5/1990  Uchida
    6,241,146 B1   6/2001  Wienand et al.
                  (Continued)

FOREIGN PATENT DOCUMENTS

CN     103137632 A    6/2013
    CN     105784171 A    7/2016
                  (Continued)

OTHER PUBLICATIONS

Sun Zhiguo et al., "Effect of Substrate Type on the Evolution of Residual Stress During and After Curing Cob Packages", Acta Metallurgica Sinica, vol. 37, Issue 12, Dec. 2001, Total p. 08.
                  (Continued)

*Primary Examiner* — Ermias T Woldegeorgis
(74) *Attorney, Agent, or Firm* — Slater Matsil, LLP

(57)            ABSTRACT

In an embodiment a sensor arrangement includes a ceramic-based substrate, at least one sensor chip connected directly to the substrate in a horizontal position by a bonding material, at least one first contact element and at least one second contact element configured to act as outer electrodes of the sensor arrangement, wherein the first contact element comprises a contact member configured to electrically contact the sensor chip by the bonding material and an insulating body enveloping the sensor chip and at least parts of the contact elements, wherein the substrate is mainly free from a material of the insulating body.

19 Claims, 2 Drawing Sheets

(51) Int. Cl.
    *G01K 1/18*         (2006.01)
    *H01C 7/04*         (2006.01)

(56)            References Cited

U.S. PATENT DOCUMENTS

| | | |
|---|---|---|
| 6,570,484 B2 | 5/2003 | Miyazaki et al. |
| 9,606,006 B2 | 3/2017 | Wienand et al. |
| 12,313,472 B2 | 5/2025 | Kho et al. |
| 2002/0057186 A1 | 5/2002 | Katsuki et al. |
| 2008/0308886 A1 | 12/2008 | Ausserlechner et al. |
| 2011/0170272 A1 | 7/2011 | Kloiber et al. |
| 2013/0127000 A1 | 5/2013 | Oganesian |
| 2017/0352603 A1 | 12/2017 | Ichiryu et al. |
| 2018/0122537 A1 | 5/2018 | Sentoku et al. |
| 2018/0306646 A1 | 10/2018 | Ihle et al. |

FOREIGN PATENT DOCUMENTS

| | | |
|---|---|---|
| CN | 211740245 U | 10/2020 |
| DE | 3839868 A1 | 6/1989 |
| JP | S5059545 U | 6/1975 |
| JP | H0982502 A | 3/1997 |
| JP | H09148101 A | 6/1997 |
| JP | H11251107 A | 9/1999 |
| KR | 20050112719 A | 12/2005 |
| WO | 9604536 A1 | 2/1996 |
| WO | 9926256 A1 | 5/1999 |
| WO | 2010015717 A1 | 2/2010 |
| WO | WO-2015104868 A1 * | 7/2015 | ............. H01C 1/012 |
| WO | WO-2017010216 A1 * | 1/2017 | .............. G01K 1/12 |
| WO | WO-2017047512 A1 * | 3/2017 | ........... A61B 5/6852 |

OTHER PUBLICATIONS

Yunwu Zhang et al., "Wide Range Temperature Sensor with Adaptive Nonlinearity Cancellation (ANC) Technique for HVICs", Electronics Letters, vol. 52, Issue 6, pp. 458-460, Mar. 17, 2016, Total p. 02.

Guan R. et al., "Research on SOI Pressure Sensor Packaging Process" Journal of Henan Polytechnic University (Natural Sciences), vol. 25, No. 06, Dec. 2006, 13 pages.

* cited by examiner

SENSOR ARRANGEMENT AND METHOD FOR PRODUCING A SENSOR ARRANGEMENT

This patent application is a national phase filing under section 371 of PCT/EP2021/083721, filed Dec. 1, 2021, which claims the priority of German patent application 102020133985.2, filed Dec. 17, 2020, each of which is incorporated herein by reference in its entirety.

TECHNICAL FIELD

The present invention relates to a sensor arrangement, e.g. a sensor arrangement for measuring a temperature. Moreover, the present invention relates to a method for producing a sensor arrangement, for example a sensor arrangement for measuring a temperature.

BACKGROUND

Temperature surface sensitivity in a NTC (Negative Temperature Coefficient) sensor design, cannot be obtained optimally due to position constrains of the sensing element, mostly in vertical position. This is aggravated by the fact that, in order to fulfill high voltage withstand and humidity resistance requirements, an intensive packaging is required.

Moreover, achieving a high operating temperature up to 200° C. is challenging, as the available material selection is very limited. None of the known sensor designs can resolve all described challenges in a small size, cost comprehensive design and a packaging solution suitable for mass production.

US Patent Application No. 2018/122537 A describes a temperature sensor comprising a carrier substrate, an NTC element, a pair of electrodes, and metal blocks that electrically contact the NTC element and form outer electrodes on the surface of an insulating housing.

International Application No WO 96/04536 A1 describes a temperature sensor with a housing made of an insulating material, a heat conducting element, a heat sensitive sensor chip arranged in the area of and/or pressed against the heat conducting element, and at least two connecting elements. At least one electroconductive pin is provided. One of the ends of the electroconductive pin applies a pressure oriented against the heat conducting element on the sensor chip and its other end is supported on the end of one of both connecting elements located inside the housing or on the ends of separate fixed parts of contact springs.

US Patent Application No. 2008/308886 A describes a semiconductor sensor comprising a carrier with a conductive structure with pads and leads, conducting lines projecting out of a resin package.

US Patent Application No. 2017/352603 A describes sensor chip packages with ceramic carriers, a conductive structure with pads and leads as well as a resin package.

KR Patent Application No. 2005/0112719 A describes an arrangement of a chip thermistor soldered to bended lead frames.

US Patent Application No. 2018/0306646 AA describes a sensor arrangement including a sensor chip with at least one electrode and at least one contacting element shaped as a metal bracket. The contacting element is arranged and configured for wireless contacting of the sensor chip.

SUMMARY

Embodiments solve the above mentioned problems.

According to a first embodiment of the present disclosure, a sensor arrangement is provided. The sensor arrangement may be adapted for measuring a temperature. The sensor arrangement may be temperature sensor arrangement. The sensor arrangement may be adapted to operate at high temperatures up to 200° C.

The sensor arrangement comprises a substrate. The substrate may be ceramic-based. In other words, the substrate may comprise a ceramic material. The substrate may be a high performing ceramic substrate which is excellent in electrical insulation and humidity resistance and has a high thermal conductivity. The substrate may further be adapted and arranged to mechanically stabilize and electrically insulate the further components of the sensor arrangement.

The ceramic material may comprise $Al_2O_3$, for example. $Al_2O_3$ (alumina) ceramics is commonly used with well-known properties i.e. high thermal conductivity, high electrical insulation, low thermal expansion. However, alternative materials both oxide and non-oxide ceramics are available as well. Silicate ceramics or even ZTA (Zirconia Toughen Alumina) for higher mechanical strength are examples of oxide ceramics. Alternatively, non-oxide ceramics such as AlN (alumina nitride) or $Si_3N_4$ (silicon nitride) ceramics may be used.

The sensor arrangement further comprises at least one sensor chip. The sensor chip may be a NTC sensor chip. Alternatively, the sensor chip may be a PTC (Positive Temperature Coefficient) sensor chip. The sensor arrangement may comprise more than one sensor chip. For example, the sensor arrangement may comprise a combination of NTC and PTC sensor chips.

The sensor chip, in particular an electrode arranged on a surface (for example the lower surface) of the sensor chip, is connected directly to the substrate in a horizontal position. "Horizontal" means that a surface of the sensor chip which has the largest extension is connected to the substrate. This increases the surface sensitivity of the sensor chip. Although the sensor chip 3 is bonded directly, it is yet fully isolated due to excellent electrical insulation and humidity resistance properties of the ceramic substrate.

The sensor chip is connected to the substrate by means of a bonding material. In other words, the sensor chip is bonded to the substrate, in particular to a metallized pad of the substrate. The bonding material may be a high melting solder material with operating temperatures>200° C. The bonding material may be leaded or lead free. Suitable materials may be $Pb_{97.5}SnAg_{1.5}$, $SnAg_{0.3}Cu_{0.7}$ or $Sn_{90}Sb_{10}$, for example.

The sensor arrangement further comprises a first contact element and a second contact element. The contact elements comprise copper, brass or phosphor bronze, for example. The contact elements are adapted and arranged to act as outer electrodes of the sensor arrangement. This means that the contact elements enable an electrical connection of the sensor arrangement from an outer side of the sensor arrangement.

The contact elements are electrically and mechanically connected to the substrate, in particular to metallized pads of the substrate. The contact elements are connected to the substrate by means of the previously mentioned bonding material.

The first contact element further comprises a contact member. The first contact element and the contact member may be integrally formed. The contact member is adapted and arranged to electrically contact the sensor chip by means of the bonding material. In other words, the contact member is bonded to the sensor chip, in particular to an electrode arranged on a surface (for example the upper surface) of sensor chip, by means of the previously mentioned bonding material.

The sensor arrangement further comprises an insulating body. The insulating body is designed to electrically insulate the sensor arrangement and to protect the sensor arrangement from environmental influences. The insulating body envelops the sensor chip completely. The insulating body envelops at least parts of the contact elements. For example, the insulating body completely covers the contact member. The substrate is, however, mainly free from a material of the insulating body.

Due to its specific design and composition, the sensor arrangement provides high performing thermal coupling for excellent surface sensitivity. In other words, the sensor arrangement is a fast response sensor. Moreover, the sensor arrangement comprises a high voltage withstand and is able to operate at temperatures up to 200° C. In addition, the sensor arrangement comprises a compact and small size and is suitable for mass production. All in all, a very robust, fast and cost-effective sensor arrangement is provided which is very flexible in use.

According to one embodiment, the material of the insulating body is adapted and arranged to increase an electrical and humidity resistance of the sensor arrangement. The insulating material of the body comprises a thermoset epoxy material with glass transition of a temperature close to 200° C.

The combination between the ceramic substrate and the insulating material fulfills high voltage withstand, humidity resistance and high operating temperature (up to 200° C.) requirements. Furthermore, it provides a specific design for a compact and small sensor arrangement. With the specific selection of materials and a well-known production process, the sensor arrangement is, in addition, very cost-effective. Materials are selected to fulfill a green product conform to ROHS (Restriction of Hazardous Substances) Directive, lead free and halogen free requirements.

The material of the insulating body is arranged directly on an upper surface of the substrate. In particular, the material of the insulating body covers at least parts of that surface of the substrate to which the sensor chip and the contact elements are connected, i.e. the upper surface of the substrate.

The connection between the sensor chip and the substrate as well as the connection between the contact elements and the substrate is packaged by the material of the insulating body. The side surfaces and a lower surface of the substrate are free from the material of the insulating body. This free area of the substrate functions as sensing part of the sensor arrangement. Moreover, also a circumferential edge region of the upper surface of the substrate may be free from the material of the insulating body.

According to one embodiment, the respective contact element is U-shaped. In particular, the contact element comprises a U-shaped bracket or spring member. In other words, the respective contact element may comprise two legs which are connected by a bar or bridge. The legs and the bar are integrally formed. This means that a first leg merges into the bar and the bar merges into a second leg of the respective contact element. In other words, the legs and the bar may be made in one piece.

The specific shape of the contact elements provides a good solder ability, less mass density and less mechanical stress to the sensor chip during the bonding process.

According to one embodiment, the respective contact element comprises a first contact area. The first contact areas may be formed/provided by one of the two legs of the respective U-shaped spring member. The first contact area is free from an insulating material of the body. In other words, the first contact areas protrude from the insulating material of the body. The first contact areas function as the outer electrodes of the sensor arrangement. In this way, an effective further processing of the sensor arrangement is enabled.

According to one embodiment, the respective contact element comprises a second contact area. The second contact areas are formed by the other one of the two legs of the respective U-shaped spring member. The second contact area is completely enveloped with an insulating material of the body. In other words, it is arranged within the insulating body of the sensor arrangement.

The second contact areas are bonded to metallized pads of the substrate to establish an electrical contact between the contact elements and the substrate. In this way, an effective electrical connection between the substrate and the contact elements is enabled. Besides, the specific shape of contact elements accumulates less heat compared to a metal block, for example. Due to fast dissipation this will result in a more accurate measurement result.

According to one embodiment, the contact member is designed to reduce mechanical stress between the first contact element and the sensor chip. The contact member may comprise a flat shape or an arcuate shape. The contact member may comprise an additional spring arranged at a free end of the second contact area of the first contact element. The contact member is arranged within an insulating material of the body. The specific shape of the contact member permits the sensor chip to be used as sensing element without wire bonds to enable a more robust connection and very economical solution.

According to a further embodiment, a method for producing a sensor arrangement is described. The sensor arrangement may be the previously described sensor arrangement. All features described in connection with the sensor arrangement apply for the method and vice versa.

The method comprises the following steps:

A) Providing a ceramic-based substrate and arranging a plurality of metallized pads onto a surface, in particular an upper surface, of the substrate. The substrate may be a high performing ceramic substrate excellent in electrical insulation and humidity resistance and having a high thermal conductivity. The substrate may comprise an $Al_2O_3$, ZTA, silicate, AlN or $Si_3N_4$ ceramic.

B) Providing a bonding material. The bonding material may comprise a solder paste. The bonding material may be a high melting solder material with operating temperatures>200° C. The bonding material may be leaded or lead-free. An example for a high melt solder but leaded material may be $Pb_{97.5}SnAg_{1.5}$. Alternatively, $SnAg_{0.3}Cu_{0.7}$ or $Sn_{90}Sb_{10}$ may be options for lead free and high temperature solder materials for applications above 200° C.

The bonding material may be applied point-like. In particular, one respective point of the bonding material may be applied to a part of the metallized pads. The bonding material may be dispensed or screen printed onto the metallized pads.

C) Providing a plurality of sensor chips. The respective sensor chip may comprise electrodes arranged on an upper side and an under side of the sensor chip (upper electrodes and lower electrodes). The sensor chips may comprise NTC and/or PTC sensor chips.

The sensor chips may be placed onto the substrate, and, especially, onto the bonding material applied on the metallized pads of the substrate. In particular, a tip of the respective sensor chip is placed onto the point-like bonding material. The sensor chips are placed such that the respective sensor chip is arranged on the substrate in a horizontal position.

D) Reflow soldering to electrically connect one of the electrodes (i.e. the lower electrode) of the respective sensor chip with the substrate such that the respective sensor chip is arranged on the substrate in horizontal position.

E) Providing again the bonding material. The bonding material may be the same bonding material as applied in step B).

The bonding material may be applied point-like. In particular, one respective point of the bonding material may be applied onto the upper electrode of the respective sensor chip. Further points of the bonding material may be applied onto at least parts of the metallized pads. In particular, two points of the bonding material may be applied to two of the metallized pads for achieving one final sensor arrangement. The bonding material may be dispensed or screen printed onto the metallized pads and the sensor chips.

F) Providing a plurality of first and second contact elements. The respective contact element comprises a first contact area and a second contact area. The first contact area is suited to act as an outer electrode of the sensor arrangement. The second contact area is suited to electrically connect the substrate to the respective contact element. The respective first contact element comprises a contact member. The contact member is adapted and arranged to establish an electrical connection between the sensor chip and the first contact element.

The contact elements are placed onto the substrate such that one respective second contact area is arranged on one respective point of the bonding material arranged on the metallized pads. Moreover, the contact elements are placed such that the respective contact member is arranged onto the point-like bonding material arranged on the upper electrode of the sensor chip.

G) Reflow soldering to electrically connect the second contact areas with the metallized pads and the contact members with the other one of the electrodes (i.e. the upper electrodes) of the sensor chip.

H) Packaging. This step includes providing an insulating material and molding an insulating body from the insulation material. The insulating material is molded such that it covers only parts of that surface of the substrate to which the sensor chip and the second contact areas are connected. i.e. the upper surface of the substrate.

The insulating material is arranged to completely package the connection between the contact elements and the substrate and the connection between the sensor chips and the substrate. The insulating material is further arranged to completely cover the sensor chip, the second contact areas and the contact members. The first contact areas as well as the side surfaces and the lower surface of the substrate remain free from insulating material. Moreover, parts of the upper surface of the substrate (e.g. a circumferential edge area) may also remain free from the insulating material.

The insulating material comprises a thermoset epoxy material with glass transition of a temperature close to 200° C.

I) Singulation. This step includes cutting the substrate into individual components to provide a plurality of sensor arrangements.

By means of the described method a fast and cost-effective process is provided for producing a plurality of sensor arrangements having a high surface sensitivity, a small size, a high voltage withstand, a humidity resistance and a high operating temperature up to 200° C. The sensor arrangement with two robust electrodes (contact elements) enables easy further processing and provides optimal system integration.

BRIEF DESCRIPTION OF THE DRAWINGS

Further features, refinements and expediencies become apparent from the following description of the exemplary embodiments in connection with the figures.

DETAILED DESCRIPTION OF ILLUSTRATIVE EMBODIMENTS

Figure 1:
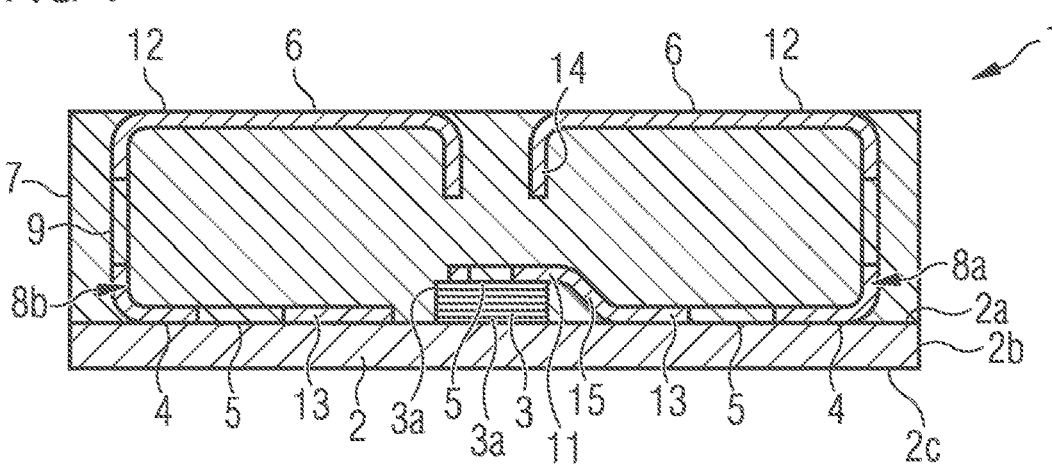
FIG. 1 schematically shows a sectional side view of a sensor arrangement according to a first embodiment.

In the figures, elements of the same structure and/or functionality may be referenced by the same reference numerals. It is to be understood that the embodiments shown in the figures are illustrative representations and are not necessarily drawn to scale.

FIG. 1 shows a sensor arrangement 1 for temperature measurement according to a first embodiment. The sensor arrangement 1 is adapted to provide a high surface sensitivity, high voltage withstand and operating temperatures up to 200° C. The sensor arrangement has a small and compact design.

The sensor arrangement 1 comprises a ceramic-based substrate 2. The ceramic material of the substrate 2 comprises $Al_2O_3$, ZTA, a silicate, AlN or $Si_3N_4$, for example. The substrate 2 is electrically insulating and comprises a high humidity resistance.

The substrate 2 comprises an upper surface 2a, a lower surface 2c and side surfaces 2b. The substrate 2 comprises metallization pads 4 which enable an electrical connection of the substrate 2. The metallization pads 4 are arranged directly on the upper surface 2a of the substrate 2.

The sensor arrangement 1 further comprises a sensor chip 3. In this embodiment, the sensor chip 3 is a NTC temperature sensor chip. However, in alternative embodiments, the sensor arrangement 1 may also comprise a PTC sensor or a combination of NTC and PTC sensors.

The sensor chip 3 comprises an electrode 3a arranged on an upper surface of the sensor chip 3 (upper electrode) and an electrode 3a arranged on a lower surface of the sensor chip 3 (lower electrode).

The sensor chip 3 and, in particular the lower electrode 3a, is bonded directly to a metallization pad 4 of the substrate 2 in a horizontal position to achieve a good surface sensitivity. In this context, the term "horizontal position" shall mean that the lower surface of the sensor chip 3—which is bonded to the substrate 2—has a larger extension than side surfaces of the sensor chip 3 which extend perpendicularly to the upper surface 2a of the substrate 2.

The sensor chip 3 is bonded to the substrate 2 by means of a bonding material 5. The bonding material 5 is a high melting solder material with operating temperatures>200° C. For example, the bonding material 5 comprises a high melt solder but leaded material such as $Pb_{97.5}SnAg_{1.5}$. Alternatively, the bonding material 5 comprises lead free $SnAg_{0.3}Cu_{0.7}$ or $Sn_{90}Sb_{10}$, for example.

The sensor arrangement 1 further comprises a first contact element 8a and a second contact element 8b. The contact elements 8a, 8b are U-shaped. In particular, they comprise two legs which are connected by means of a bar or middle piece 9. The legs and the bar 9 are integrally formed, i.e. they are made from one piece.

The contact elements 8a, 8b are at least to a certain degree elastically deformable. This helps to reduce mechanical stress which arises when the components of the sensor arrangement 1 are connected to one another. The contact elements 8a, 8b are U-shaped spring members. They comprise metal. Suitable materials for the contact elements 8a, 8b may be copper, brass or phosphor bronze.

The contact elements 8a, 8b each comprise a first contact area 12 and a second contact area 13. In this embodiment, first and second contact area 12, 13 are oppositely arranged. The first contact area 12 is situated in an upper region of the sensor arrangement 1. The second contact area 13 is arranged in a lower region of the sensor arrangement 1. The first contact area 12 is provided by one of the two legs (in particular the upper leg) of the respective U-shaped spring member. The second contact area 13 is provided by the other one of the two legs (in particular the lower leg) of the respective U-shaped spring member.

The first contact areas 12 protrude from an insulating body 7 of the sensor arrangement 1. The insulating body 7 is described later on in detail. As can be gathered from FIG. 1, the contact areas 12, do, however, not project from an upper surface of the insulating body 7/sensor arrangement 1. Rather, the upper surface of the insulating body 7/sensor arrangement 1 is flat. The contact areas 12 are integrated into the upper surface and form a part of the upper surface of the insulating body 7/sensor arrangement 1.

As already mentioned, in this embodiment, the first contact areas 12 are formed on the upper surface of the sensor arrangement 1. In other words, the first contact areas 12 are accessible from an upper side of the sensor arrangement 1 to enable further processing. The first contact areas 12 act as outer electrodes 6 of the sensor arrangement 1. A free end 14 of the upper leg of the respective contact element 8a, 8b is bent with respect to the first contact surfaces 12. In particular, the free end 14 is bent towards the substrate 2. This may help to further reduce mechanical stress.

The second contact areas 13 are connected to the metallized pads 4 by means of the previously described bonding material 5.

The first contact element 8a further comprises a contact member 11 which is bonded to the upper electrode 3a of the sensor chip 3 by means of the previously mentioned bonding material 5.

The contact member 11 is part of the first contact element 8a. In particular, it is integrally formed with the first contact element 8a. The contact member 11 is formed by a free end of the second contact area 13 of the first contact element 8a. In an intermediate region 15, the second contact area 13 passes over into the contact member 11. The intermediate region 15 is bent.

The contact member 11 is designed to reduce mechanical stress between the first contact element 8a and the sensor chip 3. The contact member 11 comprises an additional spring arranged at the free end of the second contact area 13. In this embodiment, the contact member 11 comprises a flat shape. The contact member 11 lies completely on the upper electrode 3a of the sensor chip 3.

The sensor arrangement 1 further comprises the above mentioned insulating body 7. The insulating body 7 increases an electrical and humidity resistance of the sensor arrangement 1. It comprises a thermoset epoxy material with glass transition of a temperature close to 200° C.

The material of the insulating body 7 (insulating material) covers the sensor chip 3, the contact member 11 and the second contact areas 13 completely. Also the free end 14 of the first contact areas 12 is arranged completely within the insulating body 7.

However, the first contact areas 12, in particular an upper face of the first contact areas 12 are free from an insulating material of the body 7. In other words, they protrude from the body 7, thus acting as outer electrodes 6 of the sensor arrangement 1.

Moreover, the insulating body 7 covers only parts of the substrate 2. The material of the body 7 is arranged at least partly on the upper surface 2a of the substrate 2. In particular, the insulating material covers parts of that surface of the substrate 2 to which the sensor chip 3 and the contact elements 8a, 8b are connected. Accordingly, the connections between contact elements 8a, 8b and substrate 2 and the connections between sensor chip 3 and substrate 2 are completely packaged by the material of the insulating body 7.

As can be gathered from FIG. 1, the material of the insulating body 7 does, however, not protrude over the upper surface 2a of the substrate 2. The side surfaces 2b and the lower surface 2c of the substrate 2 are free from the material of the insulating body 7. This part free from the insulating material functions as sensing part of the sensor arrangement 1.

The above described design and materials of the sensor arrangement 1 lead to a high surface sensitivity, a high voltage withstand, a high humidity resistance and a high operating temperature (up to 200° C.) of the sensor arrangement 1.

Figure 2:
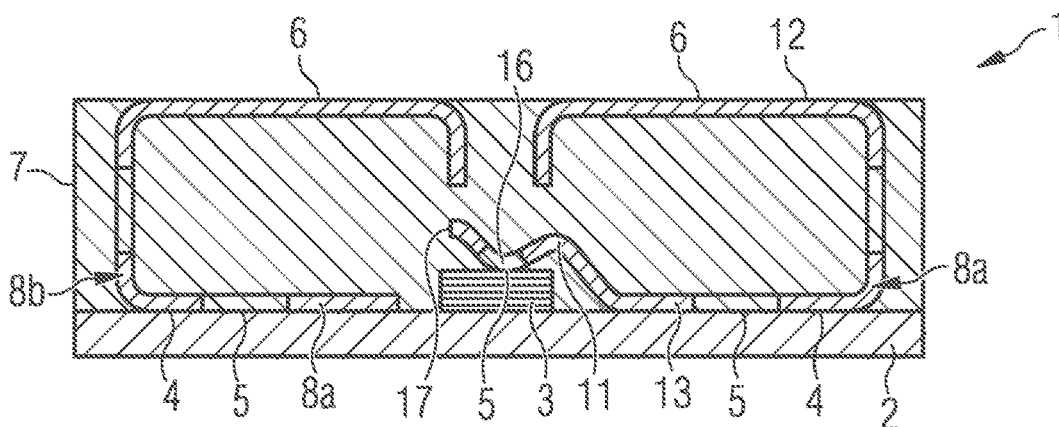
FIG. 2 schematically shows a sectional side view of a sensor arrangement according to a second embodiment.

FIG. 2 shows a sensor arrangement 1 for temperature measurement according to a second embodiment. The sensor arrangement 1 comprises the same components as the above described sensor arrangement 1, i.e. the substrate 2, the sensor chip 3, the contact elements 8a, 8b with first and second contact areas 12, 13 and the insulating body 7. With regard to these components, it is referred to the description in FIG. 1.

In contrast to the sensor arrangement described in connection with FIG. 1, the contact member 11 of the first contact element 8a is not flat but has an arcuate shape. Thus, the contact member 11 does not lie completely, i.e. over its whole extension, on the upper electrode 3a of the sensor chip 3. Rather, it is bonded only in a small area, i.e. a middle area 16, to the upper electrode 3. Side areas 17, which surround the middle area 16 of the contact member 11, are bent upwards towards the upper surface of the sensor arrangement 1.

This design helps to further reduce mechanical stress between the sensor chip 3 and the first contact element 8a. Moreover, thickness variations of the sensor chip 3 may be compensated in a better way be the arcuate shape of the contact member 11.

Figure 3:
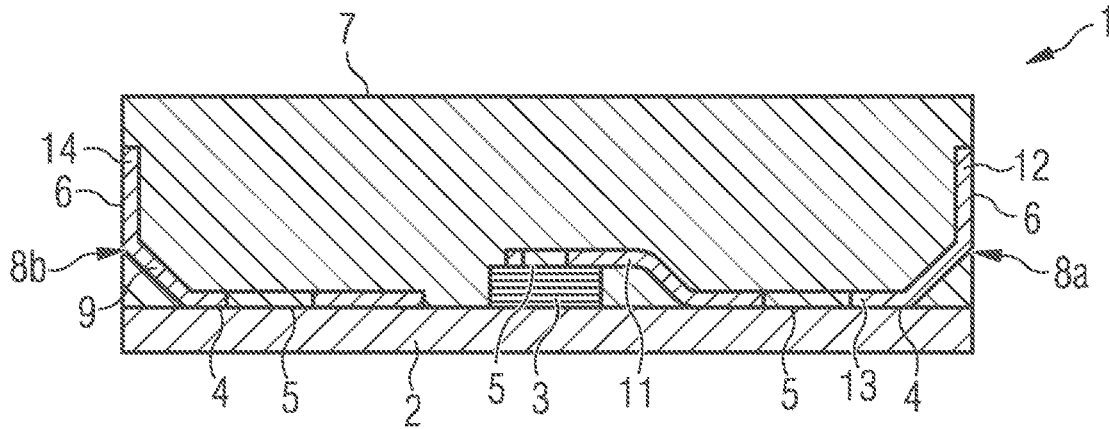
FIG. 3 schematically shows a sectional side view of a sensor arrangement according to a further embodiment.

FIG. 3 shows a sensor arrangement 1 for temperature measurement according to a third embodiment. The sensor arrangement 1 comprises the same components as the above described sensor arrangement 1, i.e. the substrate 2, the sensor chip 3, the contact elements 8*a*, 8*b* with first and second contact areas 12, 13, the insulating body 7 and the contact member 11. With regard to these components, it is referred to the description in FIG. 1.

In contrast to the embodiments described above, the first contact areas 12 are not formed on the upper surface of the insulating body 7/sensor arrangement 1. In this embodiment, the first contact areas 12 are formed on side surfaces of the body 7/the sensor arrangement 1.

Accordingly, the first contact surfaces 12 which act as outer electrodes 6 are accessible from the side surfaces of the sensor arrangement 1 to enable further processing.

Moreover, in this embodiment, the free end 14 of the upper leg of the respective contact element 8*a*, 8*b* is not bent with respect to the first contact surfaces 12. Rather, the free end extends along the side surface of the body 7 and is accessible from the outside of the body 7.

As already described in connection with FIG. 1, the contact areas 12 do not project from the side surface but are integrated into the side surface and form a part of the side surface.

Figure 4:
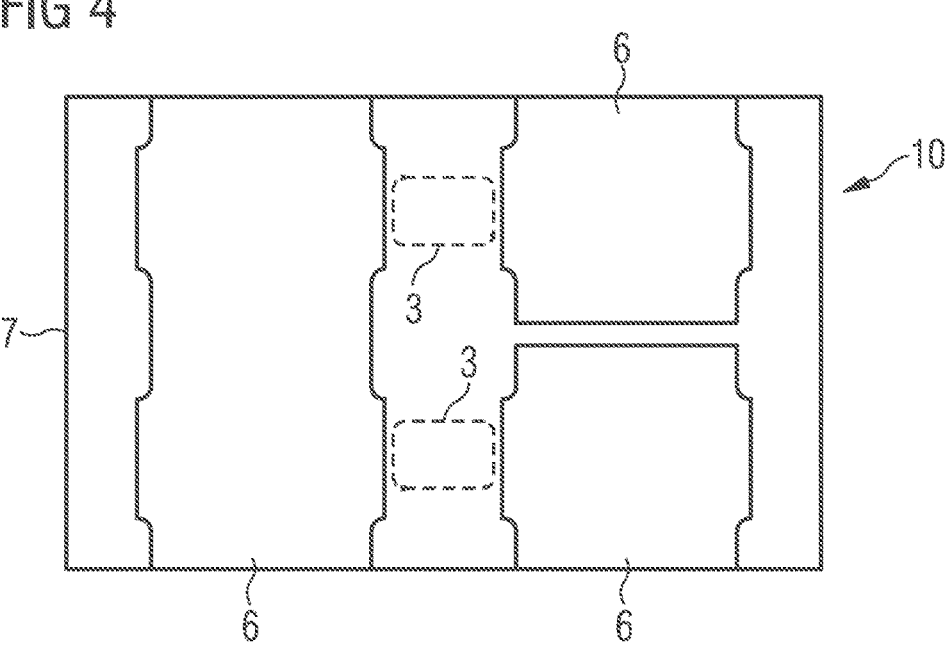
FIG. 4 schematically shows a top view of a multi sensor arrangements package.
Figure 5:
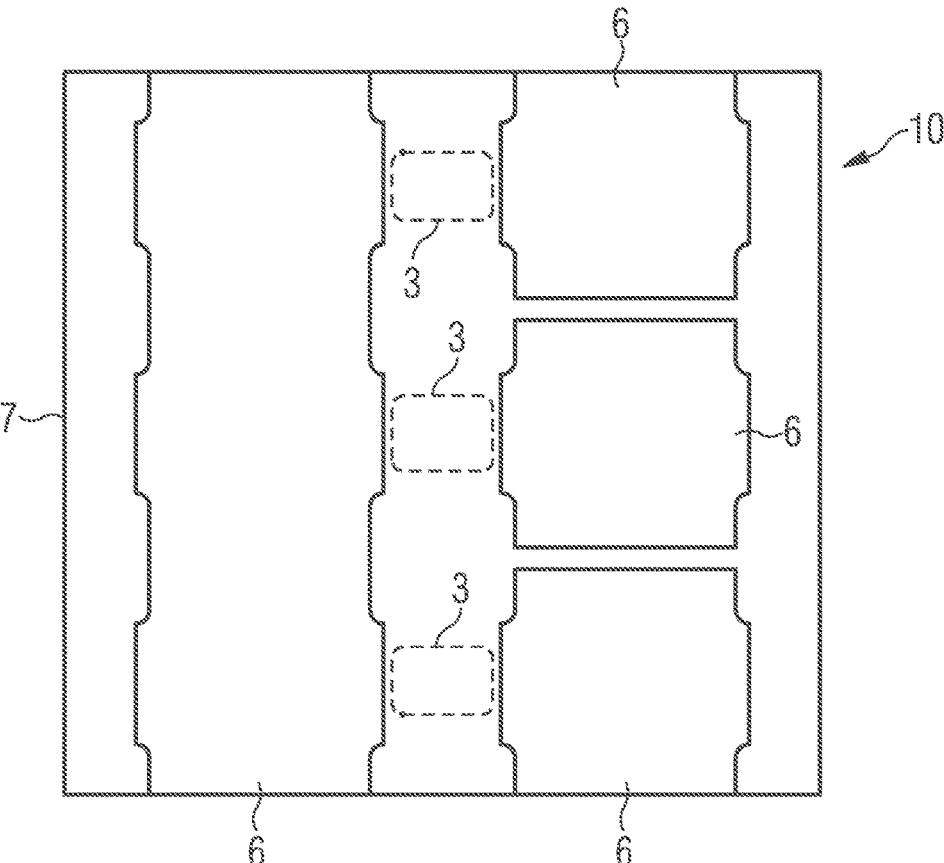
FIG. 5 schematically shows a top view of a multi sensor arrangements package according to a further embodiment.

FIGS. 4 and 5 schematically show a top view of multichip packages 10. The multichip packages 10 comprise a plurality of sensor chips 3, e.g. two sensor chips 3 (see FIG. 4) or three sensor chips 3 (see FIG. 5). Of course, a multichip package 10 can comprise more than three sensor chips 3, e.g. five or ten sensor chips 3.

The multichip packages 10 can be electrically connected by means of outer electrodes 6 which are formed by the first contact areas 12 of the contact elements 8*a*, 8*b* as described above. The contact elements 8*a*, 8*b* and the sensor chips 3 are bonded to the substrate 2 (not explicitly shown, see FIGS. 1 to 3) and are embedded in the insulating body 7.

In the following, a method for producing a sensor arrangement 1 and/or a multichip package 10 is described. In particular, by means of the method, the previously described sensor arrangement 1/multichip package 10 is produced.

The method comprises the following steps:

A) In a first step, a ceramic-based substrate 2 is provided. The substrate 2 is a high performing ceramic substrate excellent in electrical insulation and humidity resistance and has a high thermal conductivity. The substrate 2 comprises an $Al_2O_3$, ZTA, silicate, AlN or $Si_3N_4$ ceramic. Afterwards, a plurality of metallized pads 4 is arranged on the substrate 2. The metallized pads 4 are arranged on an upper surface 2*a* of the substrate 2.

B) In a second step, a bonding material 5 is provided. The bonding material 5 is a high melting solder material with operating temperatures>200° C. The bonding material 5 may comprise $Pb_{97.5}SnAg_{1.5}$, $SnAg_{0.3}Cu_{0.7}$ or $Sn_{90}Sb_{10}$, for example.

One respective point of the bonding material 5 is applied onto a partial quantity of the metallized pads 4. In particular, one specific point of the bonding material 5 is applied to one metallized pad 4 to enable the electrical connection of one of the sensor chips 3. The bonding material 5 is dispensed or screen printed onto the partial quantity of the metallized pads 4.

C) In a further step, a plurality of sensor chips 3 is provided. The sensor chips 3 may be NTC or PTC chips or a combination thereof. A combination of NTC and PTC chips is used for applications where temperature measurement is equipped with a safety function requirement. The respective sensor chip 3 comprises electrodes 3*a* which are arranged on an upper side and an under side of the sensor chip 3.

The sensor chips 3 are placed onto the substrate 2, and, in particular, onto the point-like bonding material 5. The sensor chips 3 are placed such that the respective sensor chip 3 is arranged on the substrate 2 in a horizontal position.

D) In a next step, reflow soldering takes place. In this way, the lower electrode 3*a* of the respective sensor chip 3 is electrically connected to the substrate 2. The lower electrodes 3*a* are connected with a metallized pad 4 by means of the bonding material 5 such that the respective sensor chip 3 is arranged on the substrate 2 in a horizontal position. In this way, the surface sensitivity of the sensor arrangement 1/multichip package 10 is increased.

E) In a next step, the bonding material 5 is provided again, e.g. scree-printed or dispensed. The bonding material 5 is applied point-like onto the upper electrode 3*a* of the respective sensor chip 3.

Further points of the bonding material 5 are applied to the metallized pads 4 of the remaining quantity of metallized pads 4. In particular, two points of the bonding material 5 are applied to two of the metallized pads 4 for achieving one final sensor arrangement 1. Accordingly, in this method step, altogether three points of bonding material 5 are applied for obtaining one final sensor arrangement 1.

F) In a further step, a plurality of first and second contact elements 8*a*, 8*b* is provided. Thereby, for one sensor chip 3 one pair of contact elements 8*a, b* is provided. The respective contact element 8*a*, 8*b* comprises a first contact area 12 and a second contact area 13.

The first contact area 12 acts as an outer electrode 6 of the sensor arrangement 1/multichip package 10, thus being accessible from an outer side of the sensor arrangement 1/multichip package 10.

The second contact area 13 is used to electrically connect the substrate 2 to the respective contact element 8*a*, 8*b*. The respective first contact element 8*a* comprises a contact member 11 which is used to electrically connect the sensor chip 3 and the first contact element 8*a*.

One respective contact element 8*a*, 8*b* is placed onto one point of bonding material 5 arranged on the metallized pads 4. Moreover, the contact elements 8*a*, 8*b* are placed such that the respective contact member 11 is arranged onto the point-like bonding material 5 arranged on the upper electrode 3*a* of the sensor chip 3. In other words, three points of the bonding material 5 are needed to electrically connect one pair of contact elements 8*a*, 8*b* to the substrate 2 and to further electrically connect the first contact element 8*a* (in particular the contact member 11) to the sensor chip 3.

G) In a next step, reflow soldering takes place to electrically connect the contact elements 8*a*, 8*b*, in particular the second contact areas 13, with the metallized pads 4 and to electrically connect the contact members 11 with the upper electrode 3*a* of the respective sensor chip 3.

H) In a next step, packaging takes place. Thereby, an insulating material is provided and an insulating body 7 is molded from the insulation material. The insulating material comprises a thermoset epoxy material with glass transition of a temperature close to 200° C.

The body 7 is formed such that the insulating material covers at least parts the upper surface 2*a* of the substrate 2. For example, a circumferential edge region of the upper surface 2 may remain free from the insulating material. The insulating material however completely covers the connection between the contact elements 8*a*, 8*b* and the substrate 2 and the connection between the sensor chips 3 and the substrate 2.

The insulating material further completely covers the sensor chip 3, the second contact areas 13 and the contact members 11. The first contact areas 12 remain free from insulating material. Moreover, the side surfaces 2*a* and the lower surface 2*c* of the substrate 2 remain free from insulating material, as well.

I) In a last step, singulation takes place. Thereby, the substrate 2 is cut into individual components to provide a plurality of sensor arrangements 1. The cutting pattern may vary to obtain a multichip package 10.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. A sensor arrangement comprising:
a ceramic-based substrate;
at least one sensor chip connected directly to the substrate in a horizontal position by a bonding material;
at least one first contact element and at least one second contact element configured to act as outer electrodes of the sensor arrangement, wherein the first contact element comprises a contact member configured to electrically contact the sensor chip by the bonding material; and
an insulating body enveloping the sensor chip and at least parts of the first and second contact elements, wherein the substrate is mainly free from a material of the insulating body,
wherein the material of the insulating body is arranged directly on at least parts of an upper surface of the substrate,
wherein side surfaces and a lower surface of the substrate are free from the material of the insulating body,
wherein the contact member is configured to reduce mechanical stress between the first contact element and the sensor chip, and
wherein a respective contact element comprises a U-shaped spring member, or
wherein the respective contact element comprises a first contact area, which is free from the material of the insulating body, wherein the first contact areas function as the outer electrodes, and wherein the first contact area is formed by one of two legs of a respective U-shaped spring member.

2. The sensor arrangement according to claim 1, wherein the respective contact element comprises a second contact area, which is completely arranged within the insulating body, and wherein the second contact areas are bonded to metallized pads of the substrate to establish an electrical contact between the first and second contact elements and the substrate.

3. The sensor arrangement according to claim 2, wherein the second contact areas are formed by another one of the two legs of the respective U-shaped spring member.

4. The sensor arrangement according to claim 2, wherein the contact member comprises an additional spring arranged at a free end of the second contact area of the first contact element.

5. The sensor arrangement according to claim 1, wherein the material of the insulating body is configured to increase an electrical and humidity resistance of the sensor arrangement.

6. The sensor arrangement according to claim 1, wherein the material of the insulating body comprises a thermoset epoxy material with a glass transition of a temperature close to 200° C.

7. The sensor arrangement according to claim 1, wherein the first and second contact elements comprise copper, brass or phosphor bronze.

8. The sensor arrangement according to claim 1, wherein the substrate comprises an $Al_2O_3$, ZTA, silicate, AlN or $Si_3N_4$ ceramic.

9. The sensor arrangement according to claim 1, wherein the sensor arrangement comprises at least one NTC sensor chip and/or at least one PCT sensor chip.

10. The sensor arrangement according to claim 1, wherein the bonding material comprises a high melting solder material with an operating temperature>200° C.

11. The sensor arrangement according to claim 1, wherein the sensor arrangement is configured to operate at high temperatures up to 200° C.

12. A method for producing a sensor arrangement, the method comprising:
providing a ceramic-based substrate and arranging a plurality of metallized pads on an upper surface of the substrate;
providing a first portion of a bonding material;
providing a plurality of sensor chips, wherein a respective sensor chip comprises electrodes arranged on an upper side and on an under side of the sensor chip;
reflow soldering to electrically connect one of the electrodes of the respective sensor chip with the substrate such that the respective sensor chip is arranged on the substrate in a horizontal position;
providing a second portion of the bonding material;
providing a plurality of first and second contact elements, wherein a respective contact element comprises a first contact area and a second contact area, and wherein each first contact element comprises a contact member;
reflow soldering to electrically connect the second contact areas with the metallized pads and the contact members with another one of the electrodes of the sensor chip;
packaging; and
singulating.

13. The method according to claim 12, wherein packaging comprises:
providing an insulating material; and
molding an insulating body such that the insulating material covers at least parts of a surface of the substrate to which the sensor chip and the second contact areas are connected.

14. The method according to claim 13, wherein the insulating material completely covers the sensor chip, the second contact areas and the contact members, and wherein the first contact areas are free from the insulating material.

15. The method according to claim 13, wherein the insulating body comprises a thermoset epoxy material with a glass transition of a temperature close to 200° C.

16. The method according to claim 12, wherein the substrate comprises an $Al_2O_3$, ZTA, silicate, AlN or $Si_3N_4$ ceramic.

17. The method according to claim 12, wherein the sensor chips comprise a plurality of NTC sensor chips and/or PCT sensor chips.

18. The method according to claim 12, wherein the bonding material comprises a high melting solder material with an operating temperature>200° C.

19. A sensor arrangement comprising:

a ceramic-based substrate;

at least one sensor chip connected directly to the substrate in a horizontal position by a bonding material;

at least one first contact element and at least one second contact element configured to act as outer electrodes of the sensor arrangement, wherein the first contact element comprises a contact member configured to electrically contact the sensor chip by the bonding material; and an insulating body enveloping the sensor chip and at least parts of the first and second contact elements, wherein the substrate is mainly free from a material of the insulating body, wherein a respective contact element comprises a U-shaped spring member, wherein the respective contact element comprises a first contact area, which is free from the material of the insulating body, and wherein the respective contact element comprises a second contact area, which is completely arranged within the insulating body, wherein the second contact areas are bonded to metallized pads of the substrate to establish an electrical contact between the first and second contact elements and the substrate.

* * * * *